(No Model.) 4 Sheets—Sheet 1.

C. A. HEGE.
MACHINE FOR HULLING COFFEE OR FOR OTHER PURPOSES.

No. 512,819. Patented Jan. 16, 1894.

Attest:
F. H. Schott
Alfred T. Gage

Inventor:
Constantine A. Hege,
by W. E. Henderson,
his Attorney.

(No Model.) 4 Sheets—Sheet 2.

C. A. HEGE.
MACHINE FOR HULLING COFFEE OR FOR OTHER PURPOSES.

No. 512,819. Patented Jan. 16, 1894.

(No Model.) 4 Sheets—Sheet 3.

C. A. HEGE.
MACHINE FOR HULLING COFFEE OR FOR OTHER PURPOSES.

No. 512,819. Patented Jan. 16, 1894.

Attest:
F. H. Schott
Alfred T. Gage

Inventor
Constantine A. Hege,
by his Attorney.

UNITED STATES PATENT OFFICE.

CONSTANTINE ALEXANDER HEGE, OF SALEM, NORTH CAROLINA.

MACHINE FOR HULLING COFFEE OR FOR OTHER PURPOSES.

SPECIFICATION forming part of Letters Patent No. 512,819, dated January 16, 1894.

Application filed August 10, 1892. Serial No. 442,700. (No model.)

*To all whom it may concern:*

Be it known that I, CONSTANTINE ALEXANDER HEGE, a citizen of the United States, residing at Salem, in the county of Forsyth and State of North Carolina, have invented certain new and useful Improvements in Machines for Hulling Coffee or for other Purposes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines for hulling coffee and separating the hulls and other foreign matter from the coffee after the latter has been hulled and consequently may be termed a coffee huller and separator. The machine however is not confined in its use to the hulling of coffee but can be used for decorticating rice and other cereals or grains. I will however in the description treat only of hulling coffee and the separation therefrom of all foreign matter, such being sufficient for an illustration of the construction and operation of the machine but without meaning to confine the invention to that particular use as all other uses of which it is capable are embraced within the invention.

The object of the invention generally is to provide means for most effectively hulling the coffee in the minimum of time without injury to the coffee bean itself, and then to separate the hulls and other foreign matter from the bean. It has further for its object to provide a novel construction in several parts entering into the make-up of the machine, and to provide a novel arrangement of the parts whereby the results sought to be effected are accomplished in the most satisfactory manner.

It will be sought hereinafter to more particularly specify the action of the several parts upon the matter acted upon and the results obtained as well as the several novel features of the invention; and to the accomplishment of the objects in view the invention consists in the construction, and also in the combination of parts hereinafter particularly set forth and then sought to be specifically specified, reference being had to the accompanying drawings illustrating what is considered the best form of the invention and in which—

Fig. 9 is an enlarged horizontal section through the shell and cone corresponding to line 3—3 of Fig. 4 showing the shaft in full lines and illustrating a modified form of the invention.

Figure 1:
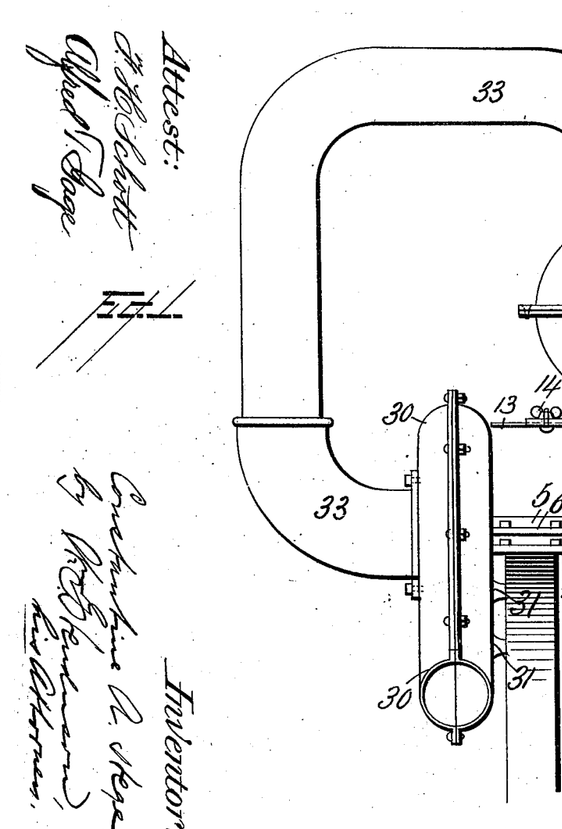
Figure 1 is a side elevation of the machine.
Figure 2:
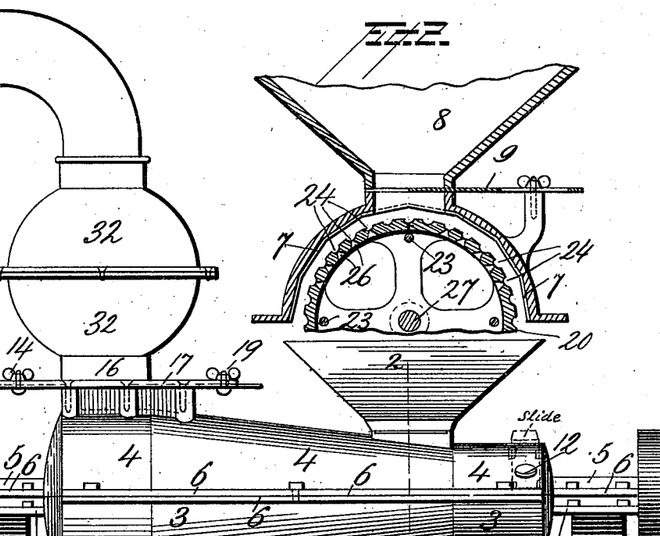
Fig. 2 is a transverse vertical section of the upper part of the machine on the line 2—2 of Figs. 1 and 3 with the lower portion of the shell and cone omitted.
Figures 3, 5:
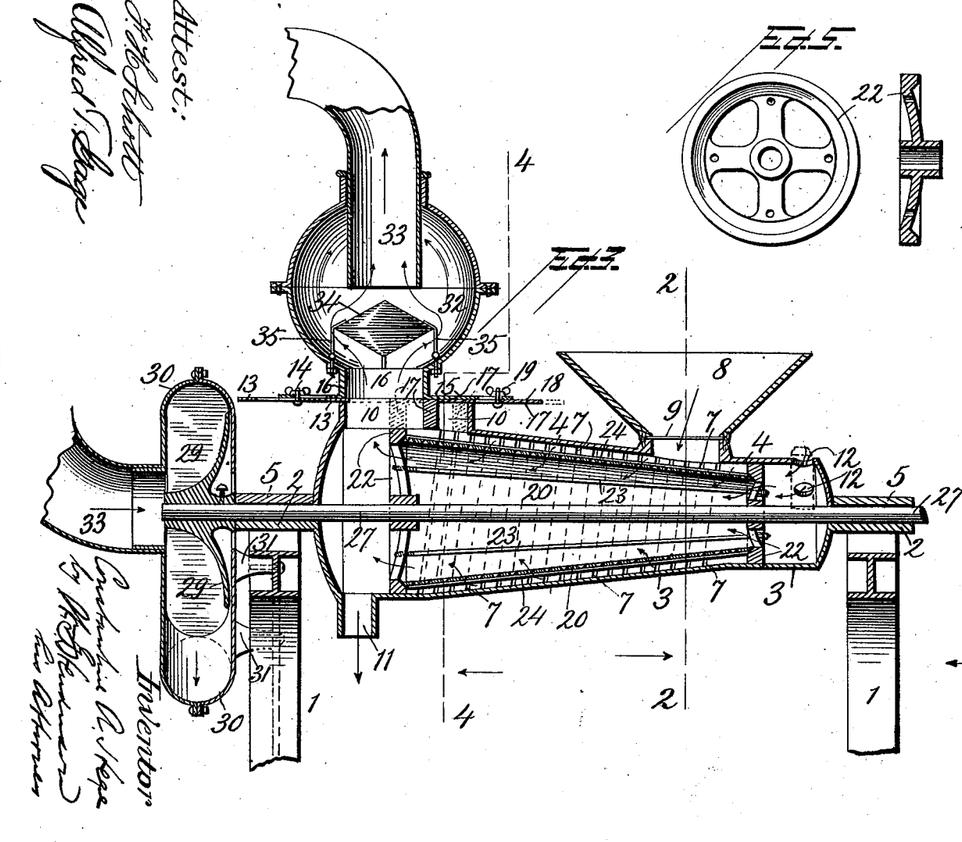
Fig. 3 a vertical longitudinal section through the machine on line 3—3, of Fig. 4.
Fig. 5 an end view of the head at the large end of the hollow cone, and also a vertical section through the same.
Figure 4:
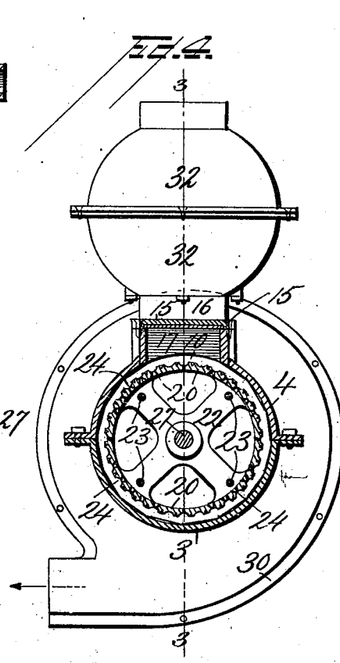
Fig. 4 an end view partly in section on the line 4—4 of Fig. 3.
Figures 6, 7:
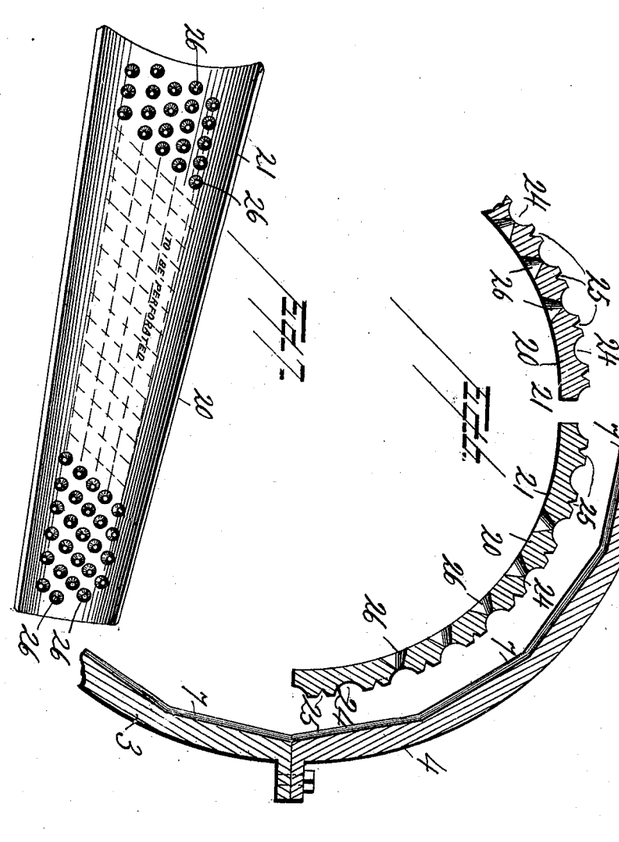
Fig. 6 an enlarged detail sectional view of a portion of the casing and of the staves or sections composing the cone.
Fig. 7 an enlarged detail perspective view of one of the staves or sections of the cone showing the perforations therein.
Figure 7:
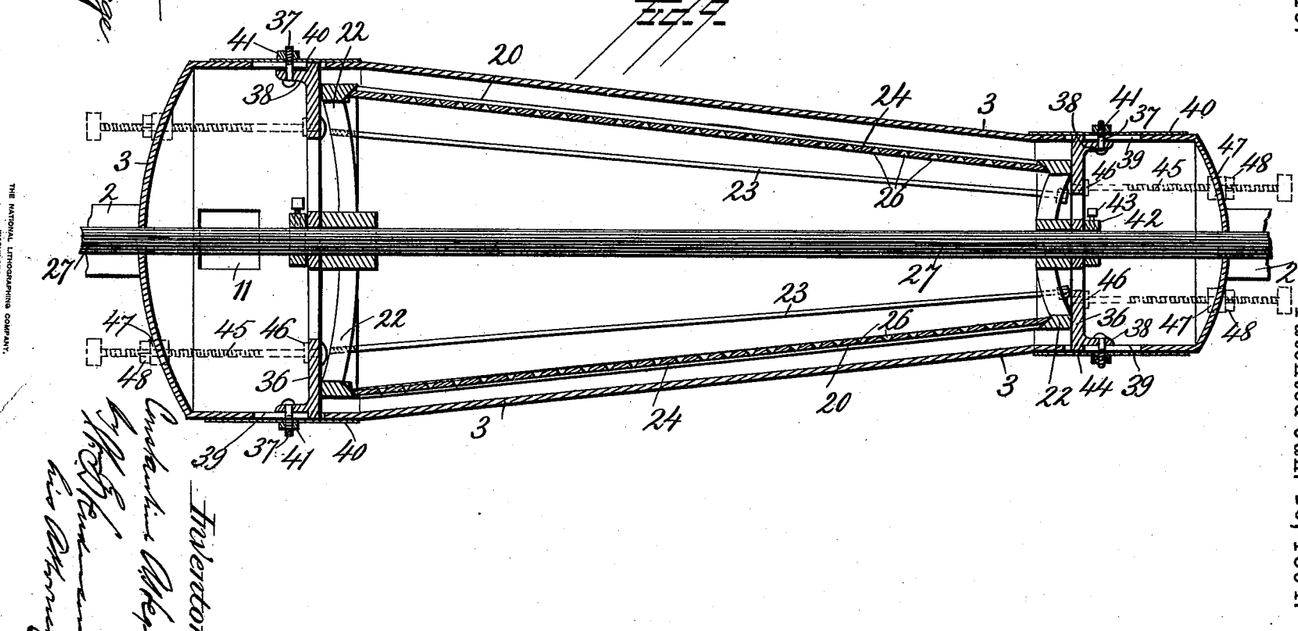

In the drawings the numeral 1 designates the two standards of any approved pattern to which are bolted the end extensions 2 of the lower half or portion 3 of the shell which incloses the hollow cone. The upper half or portion 4 of the shell rests upon the lower portion of the shell and is provided with detachable caps 5 which rest upon the end extensions of the lower portion of the shell, and the upper and lower portions are secured together by bolts passed through flanges 6 formed along the meeting edges of the two portions of the shell and their extensions. The end extensions of the shell constitute bearings for the shaft of the inclosed cone, which shaft extends through and beyond said end extensions. The shell is preferably of conical form in cross section except at its opposite ends where it is straight or cylindrical as illustrated, the conical portion in actual practice being preferably about four-sixths of the length of the shell while each straight or horizontal portion will be about one-sixth of the length of the shell. This construction allows the cone which lies within the shell to be adjusted, longitudinally without forming an opening at either end that would permit an escape of the material otherwise than as desired. The end cylindrical portion of the shell will be plain and circular on the inside while the interior of the conical portion will be polygonal and formed with spiral grooves 7 as illustrated in Figs. 2, 3, 4 and 6, the grooves when the two sections of the shell are fitted together registering with each other and forming a continuous spiral groove from end to end of the conical portion as illustrated. The polygonal shape of the interior of the conical portion of the shell allows the coffee in traveling from one end to the other to turn over longitudinally when it reaches the angles of the polygonal portions whereby first one side and then the other side of the grain is exposed to the rubbing action of the parts and the best results obtained. This polygonal construction of the interior of the shell is not claimed broadly herein as the same is the invention of W. H. B. Stout and is used in a machine made by him. The shell is provided with a feed hopper 8 provided with a slide valve 9 for controlling the feed of the grain to the interior of the shell. It is also provided with exit 10 for the passage of the material to an air spoutor chamber for the separation of the hulls and foreign matter from the grain and also with a discharge opening or spout 11 for the delivery of the grain separated from the foreign matter. It is provided at its smaller end with one or more air inlets 12 preferably located in the side walls of the cylindrical or straight portion of the shell for the inlet of air to cool the grain as well as the shell and hollow cone. This allows a current of air to be established through the shell from one end to the other so that the parts are kept cool and the heating of the grain prevented or reduced to the minimum, thus permitting the hollow cone to be driven at a much higher rate of speed than otherwise and consequently allowing the capacity of the machine to be greatly increased without the necessity of enlarging the size of the machine besides facilitating the separation of the hulls and foreign matter from the grain as the same is being cleaned or scoured. These air inlets are preferably located as stated but may be otherwise located and may be provided with slides or valves of well known constructions indicated by dotted lines in Fig. 1 for the purpose of regulating the inflow of air. The exit 10 for the material from the shell is provided with a valve of any suitable construction for regulating the force of the current of air at that point, a suitable valve for the purpose being a slide valve 13 which may be held to its adjustment by a bolt and thumb nut 14 engaging the valve and a flange 15 extending from the air passage 16 over the exit 10 as illustrated in Figs. 1 and 3 of the drawings. The exit 10 is preferably enlarged as illustrated in Figs. 1 and 3 of the drawings so that a portion of it will lie over a portion of the hollow cone and a portion will be extended beyond the head of the cone in order that a regulating valve 17 may play along the portion over the cone so as to control the passage of the grain or material from the space between the shell and the cone into the exit, and also in order that the grain which has passed from between the cone and the shell may drop down through the head of the shell beyond the head of the cone to the discharge exit 11 while the hulls and other foreign matter separated from the grain may be carried off through the pipe or passage provided therefor. The valve 17 is adjusted by any suitable means, for instance by a plate 18 extending from the valve which will be held to its adjustment by a bolt and thumb nut 19 connecting the said plate and the flange 15 which extends from the air passage 16 as illustrated clearly in Fig. 3 of the drawings. This plate 18 besides serving as a means for adjustment of the valve 17 also serves as a cover to the space of the exit 10 above the hollow cone so that when the valve 17 is adjusted to a point over the head of the cone no material can pass from the space between the cone and shell through the exit 10. The position of the valve 17 and plate 18 for this purpose is illustrated by dotted lines in Fig. 3, and the extreme position of the valve in the other direction is likewise indicated by dotted lines in Fig. 3, in which position the valve is open to its greatest extent so that the maximum amount of grain may pass from the space between the shell and the cone to and through the exit 10. It is obvious that by adjusting the valve 17 to any point between its two extremes a greater or less amount of material may be allowed to pass to and through the exit 10 and the amount to pass thus brought under the control of the attendant. In this way the coffee or other material can be retained as long or short a time as desired between the cone and the shell so that it will be subjected the length of time necessary for the thorough scouring or cleaning of the grain by the rubbing action between the shell and cone and of the grains against each other. As the head of the cone will be circular the face of the valve 17 which will seat itself on that head is made correspondingly concave so that it will fit closely and snugly to the periphery of the head of the cone and the bottom or lower edge of the valve is in line with or of the same circle as the inside of the shell at its larger end so that when the valve is seated on the head of the cone and also when it is at other points it will not break or injure the grain which may be carried to that point between the cone and the shell. It is also obvious that, under this construction the valve can be adjusted so as to leave only the space of a grain of coffee between it and the head of the cone whereby the minimum of the material will be permitted to pass while by drawing the valve farther from the head a larger space will be made and more of the material permitted to pass so that in this way the amount of material to pass out and the length of time that it shall be retained between the cone and the shell is regulated and controlled with exact nicety and the best results obtained.

Figure 8:
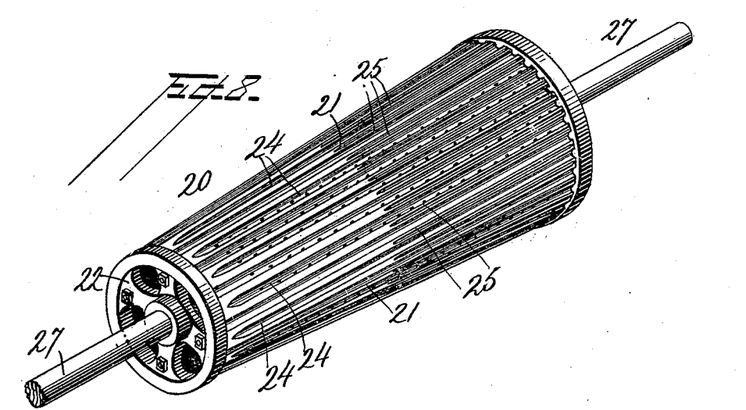
Fig. 8 an enlarged detail perspective view of the hollow cone.

The cone, which is designated by the numeral 20, is preferably composed of a series of staves or sections 21 which are fitted edge to edge to constitute the hollow cone illustrated in Figs. 3 and 8 of the drawings, each section or staves being concavo-convex as illustrated. These staves or sections are provided at each end with a head indicated by the numeral 22 which heads are preferably open as illustrated for the passage of air and for the escape at the larger end of the cone of the finer particles of foreign matter which may enter the cone. The heads and the staves or sections of the cone are held together by tie rods 23 extending from head to head within the cone and secured to the heads in any suitable manner to permit the sections or staves and heads to be drawn tightly together and securely clamped to each other. As a suitable means for effecting that result the tie-rods are represented as threaded at one end and engaging threaded holes in the solid portion of one head and as having their other ends passed through holes in the other head and nuts applied at such ends so as to draw the parts tightly together, but other constructions may be employed for effecting that end. It will also be observed that the ends of the staves are beveled and that the inside faces of the heads are formed with beveled grooves or recesses into which the beveled ends of the staves or sections fit. This is important as it allows the heads to be forced up onto the ends of the staves or sections, or the staves to be drawn down into the grooves of the head, so that the staves and the heads are drawn tightly together, or as it were wedged together at their meeting points so that as a result the parts are all strongly and rigidly clamped together without permitting any movement of the same. This construction also permits the heads to be made of the same diameter as the outside of the cone or hollow body, or smaller if desired, inasmuch as the grooves or recesses into which the ends of the staves or sections fit are cut at an angle, say, of forty-five degrees, more or less and thus enable the staves and heads to adjust themselves to each other and to be drawn closely together. This is mentioned since this feature of the invention can be applied to cylinders whether of the conical form or otherwise; but for use in this machine for hulling coffee or grain the heads of the hollow cone are made larger than the outside diameter of the cone and are caused to bear against the inner wall of the shell particularly against the cylindrical or straight portion of the shell so as to form stops which will prevent the coffee, grain or material from passing out at either end from between the cone and the shell where the heads bear against the cylindrical portions of the shell thus retaining the coffee or grain between the cone and the shell for the purpose of cleaning and scouring the same, after which it is permitted to pass out at the end where the valve 17 is located and operated as hereinbefore set forth. The outside face or surface of the hollow cone is fluted or formed with longitudinally running grooves 24 so as to increase the efficiency of the scouring action of the cone upon the grain, and a portion of the ribs lying between the grooves toward the larger end of the cone are preferably formed with longitudinal grooves 25 of smaller size than the grooves 24 as illustrated clearly in Figs. 6 and 8 so as to further increase the scouring efficiency of the cone. As the cone increases in diameter from the receiving to the delivery end of the shell, and the hulls with other materials become attached to a greater or less extent at the narrower portion of the cone, it is necessary in order to obtain the best scouring action that the larger diameter of the cone should present a greater number of edges or projections to act on the material and with that object in view I form the surface of the cone as before described. The best action is believed to be obtained by forming the grooves in the ribs smaller than the main grooves but that is in addition to the feature of the invention consisting in increasing the number of grooves in the larger diameter of the cone. It is also preferred to form perforations 26 in the grooves 24 of the cone, and to ream out these perforations on the inside of the cone so that fine particles of foreign matter separated from the coffee may pass through these perforations into the interior of the cone and thus be removed from the space between the cone and the shell thereby leaving the coffee or grain to be acted upon to better advantage for more thoroughly cleaning or scouring the same. These perforations also permit air to be drawn through the space between the cone and the shell and through the interior of the cone so as, to a greater or less extent, keep the parts as well as the coffee or grain cool and thus increase the efficiency of the machine; but while these perforations impart the advantages set forth to the machine still they are not absolutely necessary and may be dispensed with.

The cone 20 is supported within the shell upon a shaft 27 to which it is secured by any suitable means well known to the mechanic, and which shaft is supported in the bearings 2 and has secured to it a power pulley 28 and the fan blades 29 by means of set screws or other means permitting the adjustment of the pulley and fan blades, one or both. By securing the pulley and the fan to the shaft that carries the cone, friction is greatly reduced and less power required to operate the machine. The fan casing 30, preferably made in two parts bolted together as illustrated, is supported from one of the standards of the machine by brackets 31 as illustrated in Figs. 1 and 3.

The adjustment of the cone within the shell so as to increase or lessen the space between the cone and shell in order to accommodate larger or smaller grain that may be acted on, is effected simply by loosening the set screws which secure the pulley and the fan blade to the shaft 27 and then moving said shaft longitudinally so as to bring the cone to the adjustment desired for the purposes in view and afterward moving the pulley and also the fan blades so as to bring their hubs up against the boxes of the shaft and then tightening the set screws so as to hold the parts to their new adjustment. In this way the adjustment of the cylinder to accommodate the machine for larger or for smaller grain can be quickly and with ease effected.

Communicating at some suitable point with the air passage which receives the coffee, grain or material from the cone and shell, for instance at the upper end of the air passage 16 illustrated in Fig. 3, there is formed an enlargement or expansion chamber 32 so that the air entering said chamber will expand therein and thereby cause to be deposited from it such grains of coffee or other material as may be carried up by the draft of air, the coffee or other grain or material thus released from the air current falling back through the air passage 16 and down into the space of the shell to the rear of the cone head and from thence to the spout 11 to the vessel provided to receive the same, while the air thus deprived of the coffee or grain will find its exit through the pipe 33 to the fan 30 from whence it escapes carrying with it the hull, chaff and light impurities or foreign matter separated from the coffee or grain which is delivered to the spout 11 as previously set forth. The expansion chamber 32 is preferably made globular in form as illustrated and in two parts bolted together, and within it just above the discharge of pipe 16 into the same there is supported a deflector 34 in any suitable manner, for instance by the arm 35, said deflector preferably having inclined bottom and top as illustrated so that as the air current strikes against the bottom of the deflector the current will be directed sidewise while the coffee or other grain will be thrown downward and any of it that may possibly be carried above will be directed backward into the air space and through the shell and out at the final delivery as before stated. From some suitable part of the expansion chamber the pipe 33 extends and a portion of said pipe projects down into the expansion chamber as illustrated in Fig. 3 so that the air will be given a better opportunity to expand in the chamber before escaping therefrom through the pipe 33 thus insuring the deposit of the coffee or other grains while the chaff and lighter particles may be carried off through the pipe. I have described and shown this expansion chamber as located at the upper portion of the shell containing the cone but it is obvious that it may be elsewhere located and serve the same purpose without departing from the spirit of the invention, it only being necessary to locate it in the path of the air current so as to allow the air to expand and the grain or coffee to be deposited while the chaff and other impurities will be carried off. It is obvious that this can be accomplished whether the exit for the coffee and the chaff or hulls from the shell be located at the top of the shell as illustrated or at some other point as found most convenient or suitable for the purpose. This expansion chamber may also be said to constitute a separator inasmuch as the chaff and other impurities are drawn up into the same while the coffee is permitted to fall below and a further separation made by the expansion of air in the chamber so that practically nothing but the hulls, chaff and impurities are carried off through the pipe while the coffee or grain is deposited and saved as described.

While it is preferred to use the deflector 34 still the same can be omitted without departing from the other features of the invention, although the best results are obtained by the use of the deflector in the treatment of coffee.

In Fig. 9 I illustrate a modified form in which the heads of the cone may be said to be made in two parts, the portion against which the ends of the staves of the cone bear terminating practically on a line with the outside diameter of the cone, while the portion which projects beyond the outside diameter of the cone far enough to close the space between the cone and shell at opposite ends of the cone is made a part of a separate plate or ring 36 by which the same result generally is obtained as when said projecting portion is made integrally with the portion 22. In the modified form the plates or rings 36 fit inside of the straight or horizontal portion of the shell and are secured therein by suitable means, for instance by bolts 37 passed through the shell 3 and into a portion of the plates or rings 36, for instance, into lugs or ears 38 projecting from said plates or rings, the portion of the shell through which the bolts pass being slotted as shown at 39 so as to allow of horizontal adjustment of the plates or rings to accommodate them to the longitudinal adjustment of the cone, said slots being covered by plates or washers 40 held in place by the nuts 41 which hold the rings 36 to place so that no coffee or material can pass out through said slots. These plates or rings 36 will be held stationary and against the heads 22 while the latter will revolve with the cone, and if desired nuts or collars 42 may be put on the shaft 27 and held against the hubs or the rings 36 by set screws 43 as an additional means for holding the rings firmly in place against the heads 22 as illustrated in Fig. 9 of the drawings. As a further means for preventing the plates or rings 36 from turning, lugs 44 may be formed thereon to enter the slots 39 in the shell which will prevent the rings from turning. By simply loosening the nuts and the set screws 43, the plates or rings 38 may be adjusted in the direction and to the extent desired.

Instead of employing the means described for adjusting and securing the heads, I may employ screws or rods 45 indicated by dotted lines in Fig. 9, said screws being passed through the plates or rings so as to turn and being held in place by collars 46 and having their threaded portions lying in bosses 47 formed in the ends of the shell at the point where the two sections of the shell meet or elsewhere, which bosses may be internally threaded to receive the screws or rods so that by turning the screws or rods the plates or rings 36 may be adjusted to the extent desired and be held to their adjustment by suitable means, for instance by jam nuts 48 screwed on the rods and caused to bear against the bosses.

It will of course be understood that the hub of that portion of the heads against which the ends of the cone bear will be keyed or otherwise secured to the shaft 27 so that the cone will turn or revolve with the shaft.

I have illustrated a suction fan as a suitable form of fan for creating the air current but a blower or any approved form of suction or blast apparatus may be employed and be within the scope of my invention. There may also be used other forms of valves than those illustrated and they may be located to serve the purposes in view without departing from the spirit of this invention, although I have found the construction and arrangement of parts as illustrated in the drawings to best serve the purposes sought to be effected and therefore have given them as an illustration of the form considered best although not meaning to confine myself thereto notwithstanding that I claim as my invention the novel features entering into the machine as illustrated in the drawings.

The operation of the machine will be apparent from the description given in connection with the construction and arrangement of the parts as described and it is therefore unnecessary to repeat any part of such description. The advantages also of the particular construction and combination of parts will be apparent to those skilled in the art from what has been previously described and such advantages need not therefore be further enlarged upon.

With reference to the conical body having the longitudinal grooves therein it may be stated that while it is preferred to construct it as shown and described inasmuch as material advantages arise from that construction, still if the cone were made solid, or if it were made as a shell in one piece with the heads either cast or bolted to it the same would be comprised within the scope of my invention so far as forming the cone with the flutes or grooves as described and shown, and also with the heads projecting beyond the periphery of the cone, is concerned.

Having described my invention and set forth its merits, what I claim is—

1. The combination with the shell having the straight or cylindrical end portions and conical intermediate portion, of the hollow cone having at both ends a head which extends beyond the periphery of the cone and fits within the straight or cylindrical portions of the shell, and provided with openings for the inlet and the outlet of air, substantially as and for the purposes described.

2. The combination with the shell having straight or cylindrical end portions and an intermediate conical portion polygonal on its inside and having spiral grooves, of the hollow cone having longitudinal grooves upon its exterior and provided at its ends with heads extending beyond the periphery of the cone and lying within the straight or cylindrical portions of the shell, and provided with openings for the inlet and escape of air, substantially as and for the purposes described.

3. The combination with the shell having a conical portion, of the hollow cone having openings for the inlet and escape of air and fitting within the shell and formed upon its exterior with longitudinal grooves, some of said grooves being formed in ribs lying between the other grooves and toward the larger end of the cone, substantially as and for the purposes described.

4. The combination with the shell or casing, of the interior cylinder or cone having on its exterior longitudinal ribs formed with deeper grooves alternating with other grooves forming the intervals between the ribs, substantially as and for the purposes described.

5. The combination with the shell, of the revoluble hollow body fitted in said shell to leave a space between its exterior and the wall of the shell for the passage of grain and having openings in its heads, ports for admitting air into the shell, and means for impelling said air through the hollow body and shell for the purpose of cooling the parts and the grain between the hollow body and shell, substantially as and for the purposes described.

6. The combination with the shell, of the revoluble hollow body, having openings for the inlet and escape of air and fitted in said shell to leave a space between it and the wall of the shell for the passage of grain, said space being closed at opposite ends for retaining the material between the hollow body and shell, a valve for controlling the passage of the material from between said body and shell, and means for impelling air through the hollow body, substantially as and for the purposes described.

7. The combination with the shell, and the revoluble body therein, and means placed at opposite ends of said body to close at both ends the space between said body and shell of a valve located at the discharge opening for the grain from between the shell and hollow body and adapted to be adjusted to increase or decrease the discharge opening for the material and to be held to said adjustment to regulate the passage of the coffee or other grain conducted from one end to the other between the hollow body and shell, substantially as and for the purposes described.

8. The combination with the shell having a conical portion, of the hollow cone revoluble in said shell and formed with heads extending beyond the periphery of the cone at both ends thereof and a valve located at the discharge end of the space between the shell and cone and arranged to regulate the passage of coffee or other grain from between the shell and cone, substantially as and for the purposes described.

9. The combination with the shell having straight or horizontal ends and conical intermediate portion and with an inlet and exit for coffee or other grains, of a cone fitting in said shell and having heads extending beyond the periphery of the cone and bearing against the horizontal or straight portions of the shell, and a valve located at the exit for the grain from between the shell and cone to regulate the discharge of the same and adapted to be seated on the projecting portion of the head next to the exit for the grain, substantially as and for the purposes described.

10. The combination with the shell having a conical portion, a cone revoluble within said shell, and means placed at opposite ends of said cone to close at both ends the space between the cone and shell, of a valve located at the discharge end of the space between the cone and shell for regulating the discharge of coffee or other grain from between the shell and cone, a passage way for the grain and foreign matter which passes from between the cone and shell, means for creating an air current through said passage way, and a valve for regulating the force of the current through said passage way, substantially as and for the purposes described.

11. The combination with the shell having the straight or horizontal end portions and intermediate conical portion, of the cone fitting in said shell to leave a space between it and the shell and formed with heads extending beyond the periphery of the cone and bearing against the straight portions of the shell, an exit for the coffee or grain from between the cone and shell, and a valve adapted to fit to the periphery of the head at the enlarged end of the cone and means for moving said valve back and forth from over said head to regulate the passage of the coffee or grain from between the cone and shell through the exit therefor, substantially as and for the purposes described.

12. The combination with the shell having at opposite ends boxes for a shaft, of a hollow cone fitting in said shell, a shaft carrying said cone and bearing in said boxes and having adjustably attached thereto a pulley and a fan, said shaft being longitudinally adjustable to move the cone for the purpose of varying the distance between its periphery and the inner wall of the shell, the hub of said fan and of said pulley being located outside of and adjacent to the bearings of said shaft to permit longitudinal movement of said shaft, substantially as and for the purposes described.

13. The combination with the shell having straight or cylindrical end portions and conical intermediate portion, of the revoluble cone having heads projecting beyond its periphery and bearing against the straight or cylindrical portions of the shaft at points back from the two ends of the shell to form spaces in the shell at opposite ends of the cone, the space at the enlarged end being for the passage of the coffee or grain freed from chaff and impurities, substantially as and for the purposes described.

14. The combination with the shell, and the hollow body having openings for the inlet and escape of air and fitting in the shell to leave a space between them for the passage of coffee or other grain, of a passage way communicating with said shell, for the escape of foreign matter separated from the grain, an expansion chamber in communication with said passage way to cause any grain carried into said chamber to separate from the foreign matter, and means for creating an air current through said passage way and expansion chamber for the purpose of separating the chaff and impurities from the coffee, and through said hollow body for cooling the parts, substantially as and for the purposes described.

15. The combination with the shell and the revoluble hollow cone, of the passage way communicating with said shell for the passage of the hulls and foreign matter separated from the grain, the expansion chamber in communication with said passage way, and the deflector in said expansion chamber over the point of its communication with said passageway, to deflect the air and throw back the grain that may be carried up through the passage way, substantially as and for the purposes described.

16. The combination with the shell and the revoluble hollow cone, of the passage way communicating with the shell for the passage of the hulls and other foreign matter separated from the grain, the expansion chamber having communication with said passage way, and a pipe entering said expansion chamber and extending below the point of its entrance thereinto to carry off the foreign matter and prevent the escape of grain, substantially as and for the purposes described.

17. The combination of the shell having the cylindrical end portions and conical intermediate portion, the hollow cone in said shell having heads extending beyond its periphery and bearing against the cylindrical portions of the shell, the shaft supporting said cone, the passage way communicating with the shell, the valve for controlling the passage of coffee or grain from between the shell and cone, the expansion chamber having communication with the passage way, a pipe entering said expansion chamber and having connection with an air impelling apparatus, and a valve for regulating the force of the air between the shell and expansion chamber, substantially as and for the purposes described.

18. The combination with the shell, of the body located therein, heads at opposite ends of said body, projections extending beyond said heads to close the space between said body and the inner wall of the shell at opposite ends of said body, an exit opening to the space between the shell and said body at one end, and a valve to control said opening, substantially as and for the purposes described.

19. The combination with the shell and the body located within the same at a distance from its inner wall to leave a space between the two, of the rings or plates adjustable lengthwise of the shell and located at opposite ends of said body and extending beyond the periphery of the same to close the space between the body and shell at opposite ends of the body, and means for holding said rings or plates to their adjustment, substantially as and for the purposes described.

In testimony whereof I affix my signature in presence of two witnesses.

CONSTANTINE ALEXANDER HEGE.

Witnesses:
JNO. L. BRIETZ,
R. L. HENDRICKS.